(12) United States Patent
Seidel et al.

(10) Patent No.: US 9,071,044 B2
(45) Date of Patent: Jun. 30, 2015

(54) CONDUIT BODY COVER SCREW RETENTION

(75) Inventors: Daniel Seidel, Jonesboro, AR (US); James Scritchfield, Jonesboro, AR (US)

(73) Assignee: Thomas & Betts International, LLC., Wilmington, DE (US)

( * ) Notice: Subject to any disclaimer, the term of this patent is extended or adjusted under 35 U.S.C. 154(b) by 714 days.

(21) Appl. No.: 13/329,978

(22) Filed: Dec. 19, 2011

(65) Prior Publication Data

US 2012/0152395 A1 Jun. 21, 2012

Related U.S. Application Data

(60) Provisional application No. 61/424,573, filed on Dec. 17, 2010.

(51) Int. Cl.
| | |
|---|---|
| *F16L 55/10* | (2006.01) |
| *H02G 3/08* | (2006.01) |
| *H02G 9/02* | (2006.01) |
| B29C 45/14 | (2006.01) |
| B29K 27/06 | (2006.01) |
| B29L 31/24 | (2006.01) |
| F16B 41/00 | (2006.01) |

(52) U.S. Cl.
CPC ........... *H02G 3/083* (2013.01); *Y10T 29/49963* (2013.01); *B29C 45/14418* (2013.01); *B29C 45/14598* (2013.01); *B29K 2027/06* (2013.01); *B29L 2031/246* (2013.01); *F16B 41/002* (2013.01); *H02G 3/088* (2013.01); *H02G 9/02* (2013.01)

(58) Field of Classification Search
CPC .................................... H02G 3/0418

USPC ........... 138/110; 411/82.1, 258; 174/480, 50, 174/17 CT, 50.51; 220/3.8, 378
See application file for complete search history.

(56) References Cited

U.S. PATENT DOCUMENTS

| | | | |
|---|---|---|---|
| 2,354,810 A | 8/1944 | Haas et al. | |
| 3,559,308 A | 2/1971 | Bernier et al. | |
| 3,638,980 A | 2/1972 | Kleinhenn | |
| 3,976,314 A * | 8/1976 | Graham | 285/238 |
| 4,023,257 A | 5/1977 | Wright et al. | |
| 4,113,398 A | 9/1978 | Jordan | |
| 4,411,458 A * | 10/1983 | Strunk et al. | 285/196 |
| 4,504,535 A | 3/1985 | Snyder | |
| 5,391,837 A | 2/1995 | Carey | |
| 5,536,124 A | 7/1996 | Silva | |
| 5,551,141 A | 9/1996 | De'Ath et al. | |
| 5,621,189 A | 4/1997 | Dodds | |
| 6,588,999 B2 | 7/2003 | Kubler et al. | |
| 6,902,366 B2 | 6/2005 | Ducker, III et al. | |
| 7,409,973 B2 * | 8/2008 | Hyde | 144/286.5 |
| 7,638,713 B2 | 12/2009 | Pyron | |
| 7,699,571 B2 | 4/2010 | Booher et al. | |
| 7,902,466 B2 | 3/2011 | Pyron | |
| 2003/0182828 A1 | 10/2003 | Schmidt | |
| 2008/0221623 A1 * | 9/2008 | Gooch | 606/302 |

FOREIGN PATENT DOCUMENTS

| | | |
|---|---|---|
| DE | 4222734 A1 | 1/1994 |
| WO | 2007082151 A2 | 7/2007 |

* cited by examiner

*Primary Examiner* — Patrick F Brinson
(74) *Attorney, Agent, or Firm* — Butler Snow LLP

(57) ABSTRACT

An improved mechanism for retaining screws for a conduit body cover is disclosed. The screws are retained by a layer of PVC lining the inner surface of holes in the cover.

9 Claims, 2 Drawing Sheets

CONDUIT BODY COVER SCREW RETENTION

CROSS-REFERENCES TO RELATED APPLICATIONS

This application claims the benefit of U.S. Provisional Application No. 61/424,573 filed Dec. 17, 2010.

FIELD OF THE INVENTION

The present invention is generally directed toward a cover of a conduit body having a mechanism for retaining screws.

BACKGROUND OF THE INVENTION

Electrical conduit bodies may be made resistant to weather and corrosive environments by coating the exterior in a weather resistant material such as PVC. For example, the OCAL-BLUE brand conduit bodies from THOMAS & BETTS are coated in 40 mil PVC. The conduit body covers attach to the conduit body by screws that pass first through holes in the cover. Without a retention mechanism, the screws would fall out, making some installations, such as overhead installations, particularly difficult. To prevent the screws from falling out, a nylon washer is often attached to the screw on the underside of the cover.

This prior art design required the additional manufacturing hassle of applying a nylon washer to each screw in the cover. The nylon washer did not prevent the loose fitting screws from wobbling in the cover plate holes, so the screws still had to be aligned manually with the threaded screw holes in the conduit body. Since conduit is often installed in hard to reach areas, this step of aligning the screws with the screw holes in the conduit body could be difficult if the installer only has one hand available.

The presently disclosed screw retention mechanism makes both manufacturing and installation of the conduit body covers easier.

SUMMARY OF THE INVENTION

An improved screw retention mechanism for conduit body covers is disclosed. This screw retention mechanism consists of a PVC lining in the holes of the cover. The PVC lining is made by allowing PVC to coat the inner surface of the holes in the cover.

BRIEF DESCRIPTION OF THE DRAWINGS

Further advantages of the invention will become apparent by reference to the detailed description of preferred embodiments when considered in conjunction with the drawings.

DETAILED DESCRIPTION

The following detailed description is presented to enable any person skilled in the art to make and use the invention. For purposes of explanation, specific details are set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the scope of the invention. The present invention is not intended to be limited to the embodiments shown, but is to be accorded the widest possible scope consistent with the principles and features disclosed herein.

Figure 1:
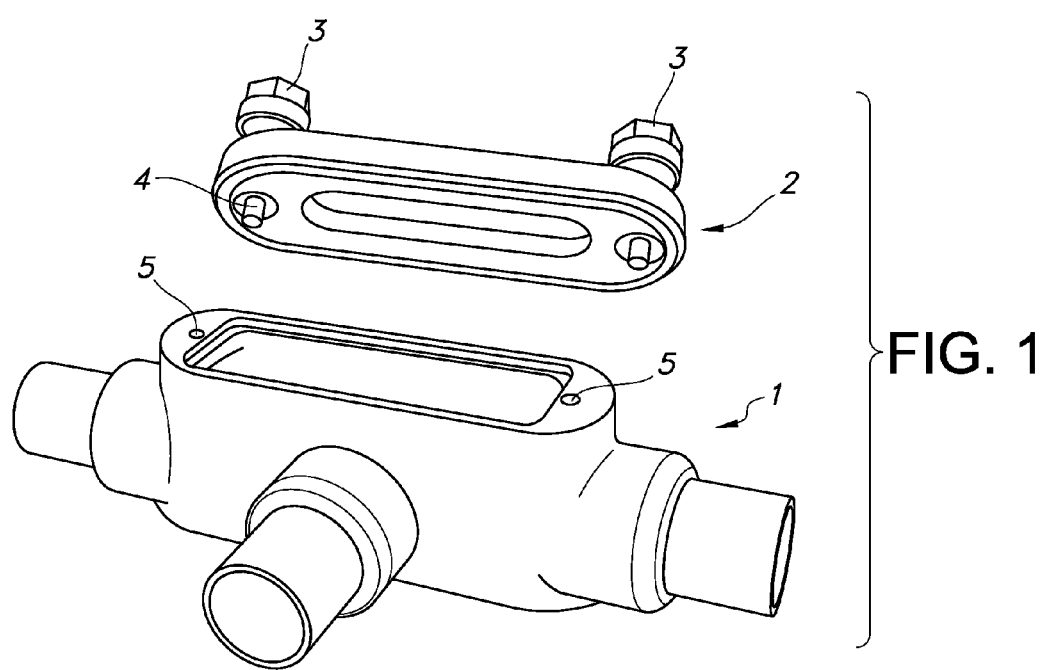
FIG. 1 depicts an exemplary conduit body and conduit cover.

Referring to the drawings, FIG. 1 illustrates an exemplary conduit body 1 and cover 2. Screws 3 pass through cover holes 4. Conduit body 1 has threaded screw holes 5 configured to receive screws 3.

Figure 2A:
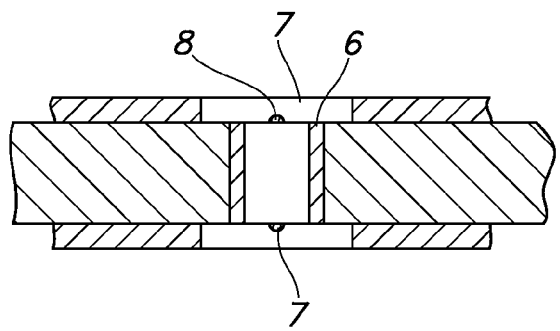
FIG. 2 depicts cross sections of the cover holes.
Figure 2B:
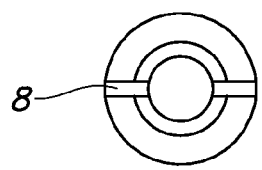
Figure 2C:
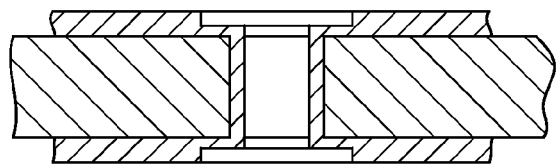
Figures 3A, 3B:
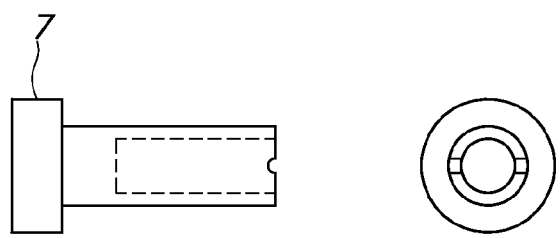
FIG. 3 depicts a clamp pin used in the injection molds

As can be seen from FIG. 2, in the preferred embodiment, the screws are retained in cover holes 4 by a PVC sleeve 6 that lines the inner surface of cover holes 4. The PVC sleeve 6 is just thick enough to engage the threads of the screws 3 and still allow the screws 3 to be pulled out manually, without the use of tools. Although this embodiment uses PVC, any malleable material may be used, including rubber and plastic.

The PVC sleeve 6 prevents the screws 3 from falling out of cover holes 4. The PVC sleeve 6 also allows the screws 3 to remain in general alignment with the threaded screw holes 5 in the conduit body 1 when the cover 2 is being positioned over conduit body 1. When the cover 2 is placed over conduit body 1, and the screws 3 are tightened, the threads of screws 3 will engage with threaded screw holes 5 in the conduit body 1. Due to the malleability of the PVC, the threads of screws 3 will slide past PVC sleeve 6, allowing cover 2 to be secured against conduit body 1.

It should be appreciated that the PVC sleeve 6 is made by a simple modification in the manufacturing process. Unlike the retention systems that use a separate washer, no additional parts are required for each cover, and no additional manufacturing steps are required to assemble the cover. The PVC coating on cover 2 is made by injection molding PVC over a cast metal cover. The injection mold includes a pair of pins 7 that are placed into each cover hole 4. The pins 7 seal against each other and press against the top and bottom surface of the cast metal cover. These pins 7 prevent PVC from completely filling in the cover holes 4. A PVC sprue 8 allows a small amount of PVC to flow into the cover hole 4. The pins 7 have a smaller diameter than the cover holes 4, and the space between the pins 7 and the inner surface of the cover holes 4 will become filled with PVC, forming the PVC sleeve 6.

Although the PVC sprues 8 are notched into the pins 7, they may also be notched into the cast metal cover.

When the mold is removed, the cover 2 will be fully coated with PVC, with the exception of top and bottom surfaces immediately around the cover holes 4. These surfaces will be mostly void of PVC, with the exception of the small sprue 8 of PVC where the molten liquid PVC flowed to the inner surface of the cover holes 4 forming PVC sleeve 6. The screws 3 can then be pushed through the cover holes 4 where they will remain.

The presently disclosed mechanism for retaining screws using a PVC sleeve 6, lining the cover holes 4, results in screws that are held in position generally perpendicular to the cover 2. As a result, they are already in alignment with the conduit body threaded screw holes 5 and simply need to be tightened in place to secure the cover 2.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition or step being referred to is an optional (not required) feature of the invention.

The invention has been described with reference to various specific and preferred embodiments and techniques. However, it should be understood that many variations and modifications may be made while remaining within the spirit and scope of the invention. It will be apparent to one of ordinary skill in the art that methods, devices, device elements, materials, procedures and techniques other than those specifically described herein can be applied to the practice of the invention as broadly disclosed herein without resort to undue experimentation. All art-known functional equivalents of methods, devices, device elements, materials, procedures and techniques described herein are intended to be encompassed by this invention. Whenever a range is disclosed, all subranges and individual values are intended to be encompassed. This invention is not to be limited by the embodiments disclosed, including any shown in the drawings or exemplified in the specification, which are given by way of example and not of limitation.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

We claim:

1. A conduit body cover having a hole for a screw wherein the inner surface of said hole is lined with a malleable material and wherein said conduit body cover top and bottom surfaces immediately around said hole are substantially free of said malleable material.

2. The conduit body cover of claim 1, wherein said malleable material lining said hole is of sufficient thickness to loosely engage the threads of the screw.

3. The conduit body cover of claim 1, wherein said malleable material is PVC.

4. The conduit body cover of claim 1, wherein said malleable material is rubber.

5. The conduit body cover of claim 1, wherein said malleable material is plastic.

6. A method of retaining a screw in a conduit body cover comprising:
   a. lining an inner surface of a screw hole in said conduit body cover with a malleable material to a thickness that causes the threads of said screw to engage with said malleable material, wherein said conduit body cover top and bottom surfaces immediately around said screw hole is substantially free of said malleable material; and
   b. inserting said screw through said screw hole lined with said malleable material.

7. The method of claim 6 wherein said malleable material is PVC.

8. The method of claim 6 wherein said malleable material is rubber.

9. The method of claim 6 wherein said malleable material is plastic.

* * * * *